Feb. 4, 1941.  H. T. SMITH  2,230,335
SPEED CONTROL DEVICE
Filed Nov. 7, 1939

INVENTOR.
Herbert T. Smith
BY
ATTORNEY.

Patented Feb. 4, 1941

2,230,335

UNITED STATES PATENT OFFICE 2,230,335

SPEED CONTROL DEVICE

Herbert T. Smith, Detroit, Mich.

Application November 7, 1939, Serial No. 303,260

11 Claims. (Cl. 123—102)

This invention relates to a speed governing device for use with automobiles and has for its primary object to provide speed sensitive means for throttling the engine of the automobile when it is operated at or above a rate of speed which may be predetermined. Although particularly adapted for use with automobiles, it will be understood, of course, that the device is also adapted for controlling the operation of engines used for purposes other than propelling automobiles.

More specifically, the main object is to provide a device which may be set to become operative at any chosen speed, and which, when operative, throttles the engine fuel supply to prevent the engine from exceeding the chosen speed.

Another object is to provide a speed control of the character above mentioned embodying means operable by the accelerator pedal for rendering the control device inoperative and thereby permitting operation of the engine at its full speed. In this respect the means operated by the accelerator is so constructed that when the accelerator is moved slowly, or at the rate it usually is moved in operating an automobile, the speed control device remains in operative condition, but when the accelerator is moved very rapidly it renders the speed control device inoperative. This feature of the invention enables the operator of the automobile to have complete control thereover when passing other vehicles or under other emergency conditions where the full power of the engine should be available to avoid a possible accident.

Another object is to provide a speed control device embodying a normally open valve adapted to throttle the fuel supply of an engine, electrical means for closing the valve to throttle the engine, and a speed sensitive control adapted to control the circuit which operates the electrical means In this circuit is a normally closed switch adapted to be opened when the accelerator pedal is moved more rapidly than it would be under normal driving conditions.

Figure 1:
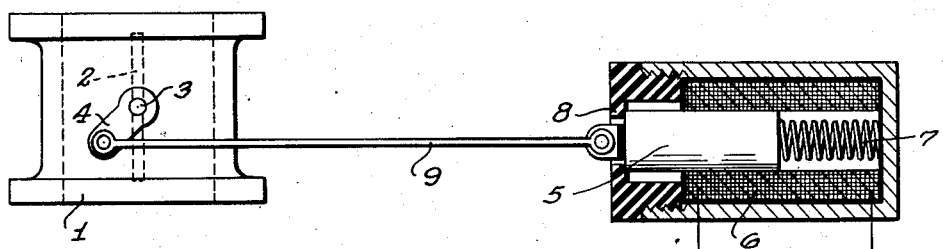
Figure 2:
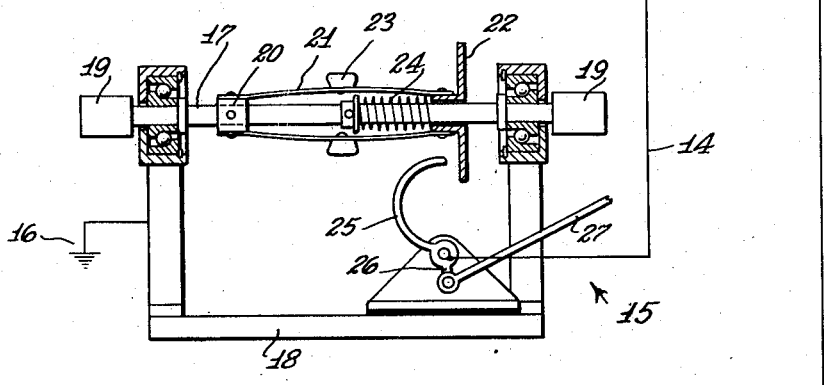
Figure 2:
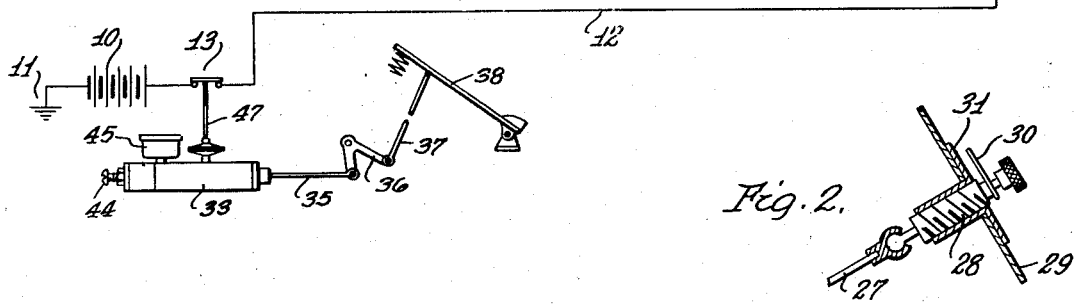
Figure 3:
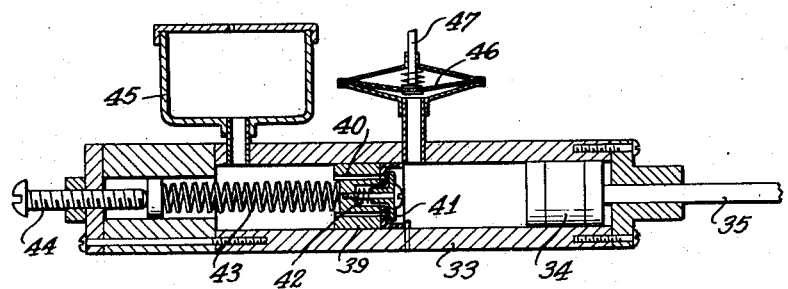
Figure 4:
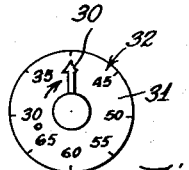

Other objects and advantages will become more fully apparent as reference is had to the accompanying drawing wherein my invention is illustrated, and in which:

Fig. 1 is a schematic view of the entire system, showing parts thereof in cross section, Fig. 2 is a cross section of the control adjustment means, Fig. 3 is a cross section of the emergency switch actuator, and Fig. 4 is an elevation of a dial means.

More particularly, I designates a conduit which might be considered as representing a portion of the fuel passage between the carburetor and the intake manifold of an internal combustion engine, or which might be considered as an element adapted to be interposed between the carburetor and the conduit leading to the intake manifold of the engine. A butterfly valve 2 is supported in the conduit 1 by a rotatable shaft 3. An arm 4, mounted on the outer end of the shaft 3, is connected to a plunger 5 of an electro-magnet 6 by a link 9. In the magnet 6 is a spring 7 which forces the plunger 5 outwardly when the magnet is de-energized, thereby causing it to normally rest against a stop 8. The stop 8 and link 9 are so correlated that the valve 2 is held in an open position when the plunger is in contact with the stop.

The circuit for controlling the electro-magnet comprises a battery 10, grounded at 11, and connected by a line 12 having a normally closed switch 13 therein to one side of the electro-magnet 6. The other side of the electro-magnet is connected by a wire 14 to a speed sensitive switch 15 through which it is adapted to be connected to the ground 16. When the switch 15 is open, as shown in Fig. 1, the electro-magnet 6 is inoperative, and the spring 7 holds the valve 2 open. When the switch 15 is closed, as hereinafter described, the magnet 6 is energized, and moves the plunger 5 to a position closing the valve 2.

The speed sensitive switch comprises a shaft 17 rotatably mounted in a bracket 18 which is adapted to be attached to any convenient part of an automobile for support thereby. The shaft 17 has coupling devices 19 on opposite ends thereof in order that it may be connected to the usual speedometer cable for rotation with the speedometer cable. It will be understood, however, that this arrangement is cited by way of example only, and that the shaft 17 may be connected to any part of the vehicle which rotates as a result of movement of the vehicle.

On the shaft 17 is a fixed collar 20 supporting flexible fly-ball springs 21, the latter being connected also to a movable disc 22 in such manner that centrifugal force resulting from rotation of the shaft 17 causes weights 23 to flex the springs 21 and move the disc 22 longitudinally of the shaft. A spring 24, sleeved on the shaft 17, yieldingly opposes movement of the disc.

Mounted on the bracket 18 is an adjustable contact 25 having an actuating arm 26 connected by a link 27 to a manually adjustable element 28 mounted on the dash 29. The adjustable element 28 has a pointer 30 which moves over a dial 31 having graduations 32 thereon enabling the operator to place the contact 25 in a position where the disc 22 will engage the contact 25 at a predetermined vehicle speed. When the disc 22 engages the contact 25 the electro-magnet circuit is closed, the magnet is energized, and the valve 2 is moved to a closed position.

The means for operating the switch 13 comprises a cylinder 33 having a plunger 34 slidable therein. The plunger 34 has a rod 35 connected to one arm of a bell crank 36, and the other arm of the bell crank is connected by a link 37 to the accelerator pedal 38. Also slidably mounted in the cylinder 33 is a piston 39 having ports 40 extending therethrough. Mounted on the piston is a valve 41 which acts to close the ports 40 to prevent the flow of liquid therethrough. The valve 41 is normally held open by a light spring 42 so that when the plunger 34 is moved slowly, liquid pumped thereby passes through the ports, but when the plunger 34 is moved rapidly, the valve seats and closes the ports.

A spring 43 opposes movement of the piston 39 and thereby causes the liquid trapped between the plunger and piston to be placed under pressure and a set screw 44 enables adjustment of the spring to vary the amount of pressure on the liquid so trapped. A flow chamber 45 is connected to the cylinder 33 to accommodate the liquid displaced therefrom by movement of the piston 39, and a diaphragm 46 is connected to the cylinder 33 for actuation by liquid displaced therefrom by the plunger 34. The diaphragm is connected by a rod 47 to the switch 13 and normally holds the switch closed. When the diaphragm is flexed by liquid under pressure as a result of rapid movement of the accelerator pedal the diaphragm causes the switch 13 to be opened.

When the valve 41 closes, the spring 43 permits the piston to move with the plunger 34, due to the presence of a solid column of liquid between the piston and plunger. The spring 43 will maintain the liquid under sufficient pressure to maintain the valve closed until the accelerator is returned to the point at which rapid movement was started, which might even be its fully retracted position. Therefore, the speed governing device will remain inoperative until such time as the operator returns the accelerator to a position corresponding to the speed at which the vehicle was travelling, or a lower speed. This function is important in that it enables the operator to avail himself of the full power of the engine for any desired length of time, thereby making it possible to pass other vehicles and avoid accidents resulting from traffic conditions where acceleration of the vehicle to a speed above that at which the governing device is set should be permitted.

Although a specific embodiment of the invention has been illustrated and described, it will be understood that various changes may be made within the scope of the appended claims without departing from the spirit of the invention, and such changes are contemplated.

What is claimed is:

1. A speed sensitive device for a vehicle having an engine and an accelerator pedal therefor, comprising a normally open valve adapted when closed to throttle the fuel supply of the engine, speed sensitive means for rendering said valve closing means operative at vehicle speeds which may be predetermined, and means operated by movement of the accelerator pedal for rendering said valve closing means inoperative, said last named means being rendered operative by rapid movement of said pedal and remaining inoperative when said pedal is moved slowly.

2. A speed sensitive device for a vehicle having an engine and an accelerator pedal therefor, comprising a normally open valve adapted when closed to throttle the fuel supply of the engine, speed sensitive means for rendering said valve closing means operative at vehicle speeds which may be predetermined, and a device operated by movement of the accelerator pedal for rendering said valve closing means inoperative, said device including means for maintaining itself inoperative when the accelerator pedal is moved slowly and for rendering itself operative when the accelerator pedal is moved rapidly.

3. A speed sensitive device for a vehicle having an engine and an accelerator pedal therefor, comprising a normally open valve adapted when closed to throttle the fuel supply of the engine, speed sensitive means for rendering said valve closing means operative at vehicle speeds which may be predetermined, and a device operated by movement of the accelerator pedal for rendering said valve closing means inoperative, said device including means for maintaining itself inoperative when the accelerator pedal is moved slowly and for rendering itself operative when the accelerator pedal is moved rapidly, said device also including means for maintaining itself in operative condition, when once rendered operative, during all movements of the accelerator pedal until the pedal is retracted to a point where the rapid movement started.

4. A speed control device for a vehicle having an engine and an accelerator pedal, said device comprising a normally open valve adapted when closed to throttle the fuel supply of the engine, electro-magnetic means for closing said valve, and an electric circuit for said magnetic means, said circuit including a speed sensitive switch adapted to close said circuit at vehicle speeds which may be predetermined, a normally closed switch, and a device operatively connected to said accelerator pedal for opening said normally closed switch, said device including means for rendering itself operative when the accelerator pedal is moved rapidly and inoperative when said pedal is moved slowly.

5. A speed control device for a vehicle having an engine and an accelerator pedal, said device comprising a normally open valve adapted when closed to throttle the fuel supply of the engine, electro-magnetic means for closing said valve, and an electric circuit for said magnetic means, said circuit including a speed sensitive switch adapted to close said circuit at vehicle speeds which may be predetermined, a normally closed switch, and a device operatively connected to said accelerator pedal for opening said normally closed switch, said device including means for rendering itself operative when the accelerator pedal is moved rapidly and inoperative when said pedal is moved slowly, said device also including means for maintaining itself operative, when once rendered operative, during all movements of the accelerator pedal beyond the point where its operation started.

6. In a speed control device, throttle means for an engine, an electro-magnet for operating said throttling means, a speed sensitive device having a contact member and centrifugal means for moving said contact member, an adjustable contact member disposed in the path of the first contact member, means for adjusting said adjustable contact member from a remote point, a normally closed switch, an electrical supply source in circuit with said contact members, the normally closed switch and said electro-magnet, a foot pedal, and means connecting the pedal to said normally closed switch, said means operatively connecting the pedal to the switch as a function of movement of the pedal at or above a rate of speed which may be predetermined, and said means maintaining said connection when once established until the pedal is moved to a position corresponding to the speed or a lower speed than that at which it operated.

7. In combination with a speed governing device for use with an automobile having an accelerator pedal, an emergency control for rendering said governing device inoperative, said control having means actuated by said accelerator pedal when and only when the pedal is moved at or above a rate of speed which may be predetermined.

8. In combination with a speed governing device for use with an automobile having an accelerator pedal, an emergency control for rendering said governing device inoperative, said control having means actuated by said accelerator pedal when and only when the pedal is moved at or above a rate of speed which may be predetermined, and also including means for maintaining the control operative after it has been once rendered operative and during movement of the pedal at a rate slower than said predetermined speed.

9. In combination with a speed governing device for use with an automobile having an accelerator pedal, an emergency control for rendering said governing device inoperative, said control having means actuated by said accelerator pedal when and only when the pedal is moved at or above a rate of speed which may be predetermined, and also including means for maintaining the control operative after it has been once rendered operative and during movement of the pedal at a rate slower than said predetermined speed, said last named means being rendered inoperative by movement of the pedal to a retracted position.

10. In combination with a speed governing device for use with an automobile, an emergency control for rendering said governing device inoperative, said control device comprising a hydraulic cylinder, hydraulic means for operating the control, a plunger for displacing liquid from the cylinder to operate the hydraulic means, a by-pass accommodating liquid displaced by said plunger to enable actuation of the plunger without actuation of said hydraulic means, and means for closing said by-pass when the plunger is moved at a rate of speed which may be predetermined.

11. In combination with a speed governing device for use with an automobile having an accelerator pedal, an emergency control for rendering said governing device inoperative, said control device comprising a hydraulic cylinder, hydraulic means for operating the control, a plunger for displacing liquid from the cylinder to operate the hydraulic means, a by-pass accommodating liquid displaced by said plunger to enable actuation of the plunger without actuation of said hydraulic means, means for closing said by-pass when the plunger is moved at a rate of speed which may be predetermined, and means connecting said plunger to said accelerator for actuation thereby.

HERBERT T. SMITH.